July 8, 1958    R. P. MULDOON ET AL    2,842,712
SIGNAL GENERATOR
Filed March 6, 1953    2 Sheets-Sheet 1

INVENTORS
ROBERT P. MULDOON
FRANKLIN HIMMELBERGER
BRANDON K. FULLER
BY
Brown, Jenks & Lynnestvedt
AGENTS July 8, 1958   R. P. MULDOON ET AL   2,842,712
SIGNAL GENERATOR Filed March 6, 1953   2 Sheets-Sheet 2

INVENTORS
ROBERT P. MULDOON
FRANKLIN HIMMELBERGER
BRANDON K. FULLER
BY
Brown, Denk & Synnestvedt
AGENTS United States Patent Office 2,842,712
Patented July 8, 1958

2,842,712

ELECTRONIC SIGNAL GENERATOR

Robert P. Muldoon, Doylestown, Franklin Himmelberger, Coopersburg, and Brandon K. Fuller, Souderton, Pa., assignors to Philco Corporation, Philadelphia, Pa., a corporation of Pennsylvania Application March 6, 1953, Serial No. 340,852

14 Claims. (Cl. 315—39)

The present invention relates to signal generators and more particularly to signal generators for producing a signal having a uniform energy distribution over a very wide frequency band.

Signal generators for producing a signal having a uniform distribution over a very wide frequency band are known in the art as noise sources. The advantages of employing a standard noise source in testing radio wave receivers and the various component parts thereof have become widely recognized. In general, the noise figure F of a circuit or circuit element may be determined by first measuring the noise output of the element under test with the input thereof terminated in its characteristic impedance and again measuring the noise output with the standard noise source connected to the input terminals. The noise figure may be determined directly from the known noise temperature of the source and the ratio of the two measured noise outputs. The advantages to be derived from the use of a noise source in testing receivers and their components result, in part, from the fact that standard noise sources produce signals whose energy content is uniformly distributed over a wide frequency band. This makes detailed knowledge of the frequency passband of the element under test unnecessary. Further advantages result from the fact that an ideal noise source generates signals at a low power level suitable for direct application to the element under test. Thus, the standard noise source does not require the extensive shielding and accurately calibrated attenuator common to C. W. signal generators where the power level of the generated signal may be of the order of 100 decibels above that actually required for the measurements to be made. Noise sources of several types, such as the temperature limited diode and the waveguide gas tube noise source, have been known in the art for a number of years. However, none of the noise sources heretofore available were wholly satisfactory in the 470 to 920 megacycle band allotted to ultrahigh frequency television. The temperature limited diode has an upper operating limit of approximately 300 megacycles if conventional glass envelope type of construction is employed. The range of the temperature limited diode can be extended to 1000 megacycles or more by forming the diode as part of the transmission system but this is uneconomical for several reasons. First, the life of this type of noise source is relatively short while the cost is relatively high; second, temperature limited diodes require expensive auxiliary circuits for adjusting the noise output therefrom to a standard level; third, the temperature limited diode must be calibrated against a primary standard of noise power and the calibration checked from time to time if accurate data are required; and fourth, the temperature limited diode requires careful matching to the transmission line.

It has been discovered that an electrical discharge through an inert gas produces a noise output that is uniform over a very wide frequency band lying in the microwave region, provided certain conditions are met. It has been established that, if these conditions are met, the noise output is relatively independent of applied potential, ambient temperature, aging and other factors likely to be encountered in normal usage of the noise source. Noise sources comprising a gas filled tube extending diagonally through a waveguide are now in general use. These noise sources have proved to have a low initial cost, a very long life and an extremely stable output, so that recalibration is seldom if ever required. However, these noise sources have an operating range limited to the microwave region by reason of their waveguide construction.

The rapid development of ultrahigh frequency television has emphasized the need for a simple, reliable and inexpensive noise source for use at ultrahigh frequencies. Preferably such a noise source should be portable and sufficiently stable in its operation to withstand the shocks and differences in operating conditions likely to be encountered in the use of such a noise source by a television serviceman without appreciable change in the power output thereof or need for periodic recalibration. Furthermore, the noise source should be of a type that is readily connected to a standard two-conductor transmission line without the use of special fittings or matching sections. Finally, the ideal noise source should have sufficient accuracy so that it can serve as a piece of precision laboratory equipment when necessary.

It is an object of the present invention to provide such a low cost, reliable noise source which is suitable for operation in the 450 to 900 megacycle band.

It is a further object of the present invention to provide noise sources that can be inserted in a standard two-conductor transmission line without altering the electrical characteristics thereof.

Still another object of the present invention is to provide a simple, reliable, inexpensive and portable noise source suitable for use by the television serviceman.

Still another object of the present invention is to provide a simple, reliable noise source having an extremely stable and precisely known noise output.

These, and other objects of the present invention which will appear as the description of the invention proceeds, are achieved by forming a section of two-conductor transmission line with a gas filled enclosure disposed between and adjacent to the two conductors thereof. Anode and cathode structures necessary for the establishment of a electrical discharge through the gas filled enclosure are provided at longitudinally spaced points on the transmission line. In one preferred embodiment of the invention, the gas filled enclosure is isolated from direct electrical contact with at least one of the conductors of the transmission line.

For a better understanding of the invention together wiht other and further objects thereof, reference should now be made to the following detailed description which is to be read in conjunction with the accompanying drawings in which.

Figure 1:
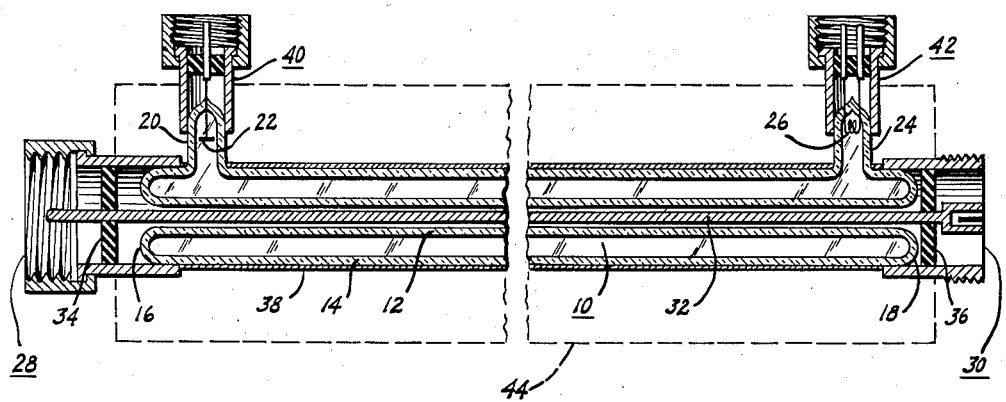
Fig. 1 is a detailed sectional view of the preferred embodiment of the invention.

As shown in Fig. 1, the preferred embodiment of the invention comprises a concentric glass envelope 10 which is formed by an inner cylinder 12 and an outer glass cylinder 14 joined at the two ends by glass seals 16 and 18. The envelope thus formed has the shape of an elongated toroid. It has been found that optimum performance of the noise source is obtained over the 600 to 900 megacycle band if the concentric envelope structure 10 has over-all length between seals 16 and 18 of approximately 17 inches. An auxiliary chamber 20 is formed adjacent seal 16 to receive anode structure 22. A similar auxiliary chamber 24 is disposed adjacent seal 18 to receive filamentary cathode structure 26. The concentric cylinder structure 10 and auxiliary chambers 20 and 24 which communicate therewith are filled with an inert gas, for example helium or argon, at a pressure of approximately 20 millimeters of mercury. The pressure is not critical and any value between 10 and 60 millimeters of mercury has been found to be satisfactory. Below 10 millimeters the noise output may fluctuate some with changes in pressure within the tube during the operation thereof. Pressures above 60 millimeters require the use of a larger and more expensive power supply and hence are not to be preferred. It is believed that any inert gas may be used but since the less expensive gases, such as neon, argon and helium, give satisfactory results, the use of these gases is suggested. The external shell of a coaxial connector 28, which will fit a standard coaxial cable, is mechanically secured to one end of outer cylinder 14 by any convenient means such as by cementing or sealing the outer shell of the connector to the glass envelope. It has been found that the noise source of Fig. 1 gives optimum performance when the anode 22 is disposed adjacent to the receiver or other element under test. Therefore connector 28 is preferably a male connector which will engage the female connector usually provided on a receiver. A second coaxial connector 30 is secured to the outer cylinder 14 at the end adjacent cathode 26. Again connector 30 may be secured to cylinder 14 in any convenient manner. Usually it will be desirable to make connector 30 a female connector so that the noise source shown in Fig. 1 may be connected in series with a standard coaxial line without the necessity of adding special fittings. A conductive rod 32 extends axially through inner cylinder 12 to form the inner conductor of a coaxial transmission line. The ends of conductive rod 32 form the center terminals of coaxial connectors 28 and 30. Conductive rod 32 is maintained in a non-contacting relationship with inner cylinder 12 by dielectric supporting discs 34 and 36 disposed within coaxial connectors 28 and 30, respectively. Outer cylinder 14 is provided with a conductive coating 38 which makes electrical contact with the outer shells of connectors 28 and 30. Conductive coating 38 forms the outer conductor of the coaxial transmission line extending between connectors 28 and 30 and, for this reason, the coating should be substantially continuous and of relatively low resistance. This metallic coating may be applied in any convenient manner. However, it has been found in practice that silver plating gives results which are somewhat superior to other methods of application. A single contact connector 40 is secured to auxiliary chamber 20 with the single contact thereof joined to anode structure 22. The outer shell of connector 40 may make electric contact with coating 38 in all applications where the outer conductor of the noise source is to be maintained at ground potential. A two-terminal connector 42 is secured to auxiliary chamber 24 with the two terminals thereof connected to the respective ends of filamentary cathode 26. Again the outer shell of connector 42 may be electricaly connected to outer coating 38 if the latter is at ground potential. The electrical connection between connectors 40 and 42 and the conductive coating 38 provides a shielding effect which is desirable but not essential to the operation of the invention since fluctuation of the potentials applied between anode 22 and cathode 26 caused by stray pickup and other reasons will have little effect on the noise output of the system shown in Fig. 1. In practice, it will usually be desirable to enclose the entire noise source shown in Fig. 1 in a suitable housing to protect the breakable glass envelope structure 10. This housing is schematically illustrated in Fig. 1 by the broken line 44. This housing may be mechanically connected to connectors 28, 30, 40 and 42 by soldering, cementing or clamping, or the housing 44 may be isolated from these connectors by any suitable means, for example rubber grommets.

Figure 2:
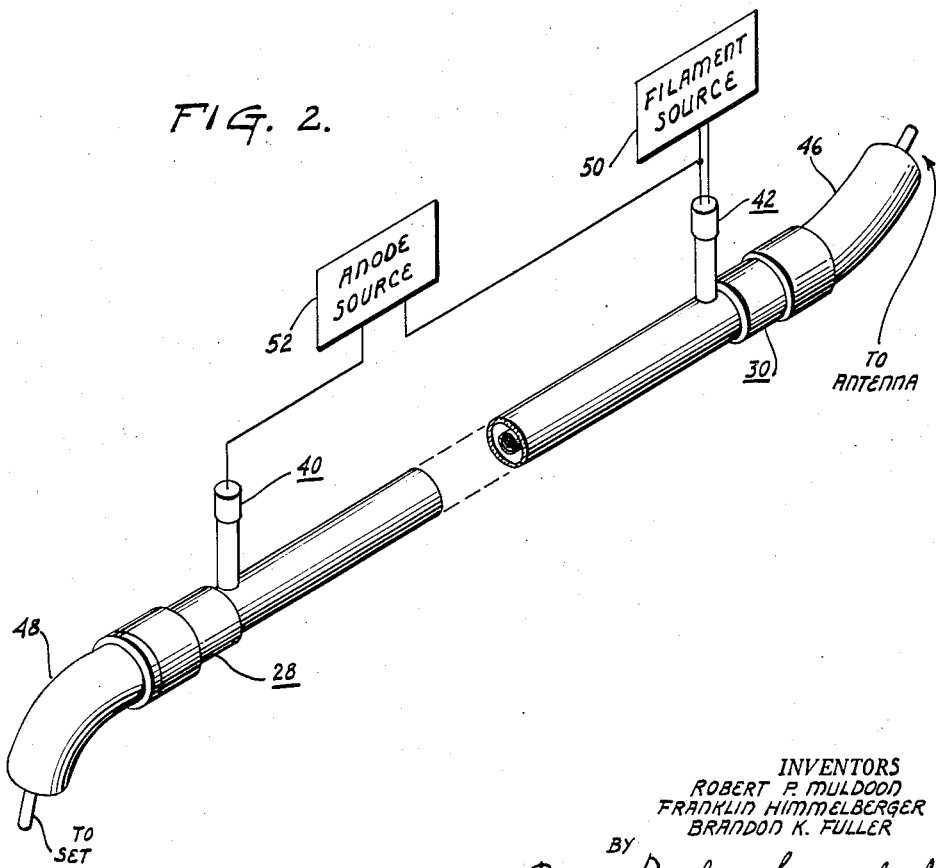
Fig. 2 is a pictorial view of the embodiment of the invention shown in Fig. 1 inserted in a standard coaxial transmission line.

Fig. 2 is a pictorial view of the preferred embodiment of the invention connected in series with coaxial transmission line 46—48. As shown in Fig. 2, the coaxial line 46 is joined to the cathode end of the noise source and coaxial line 48 connects the receiver or other circuit element under test to connector 30 at the anode end of the noise source. Coaxial line 46 may be connected to an antenna or to a dummy load having a preselected impedance. A source 50 of filament current is connected to connector 42 and a source of anode potential 52 is connected between connector 40 and one terminal of connector 42. If the noise source shown in Figs. 1 and 2 is to form part of a portable test set suitable for use by a television serviceman, potential sources 50 and 52 may be included within housing 44 diagrammatically shown in Fig. 1. By way of typical example, filament source 50 may be a conventional filament transformer and anode source 52 may be a transformer-rectifier source supplying approximately 250 volts D.-C. between the cathode 26 and anode 22. It may be desirable to include a swinging choke in series with the power supply to provide an initial surge for initiating the discharge through the gas. It is possible to initiate the discharge through the gas without heating the cathode structure but this may shorten the life of the cathode. The heating current may be interrupted once the discharge is initiated without damaging the noise source.

The noise source shown in Figs. 1 and 2 is operated in the following manner. One end of the noise source, preferably the end adjacent anode 22, is connected to the receiver or circuit element under test. The potentials are supplied to the filamentary cathode 26 and to the anode 22. These potentials cause an electrical discharge to take place through the gas confined within coaxial envelope structure 10. If the gas is at the pressure specified above, the noise power output of the tube will be at a level of about 16 decibels. This power level will be substantially independent of all normal fluctuations in current supplied to cathode 26 and potential applied to anode 22. The power level is also substantially unaffected by rather wide variations in ambient temperature. The impedance of the noise source, when dimensioned to fit a standard coaxial line, will be approximately 50 ohms so that no matching is required between the line and the noise source. If the spacing between anode 22 and cathode 26 is of the order of 17 inches, the impedance looking into the anode end of the noise source will be substantially independent of the termination at the cathode end when the electrical discharge is taking place. Therefore the cathode end of the noise source may be terminated in its characteristic impedance by a suitable coaxial load or by connecting a transmission line of like characteristic impedance from a matched antenna or other signal source to connector 30. The impedance looking into the anode end of the noise source is independent of termination at the cathode end for the reason that the gaseous discharge provides a relatively high attenuation of signals passing therethrough, so that any signal supplied to the anode end is attenuated to a very low level in passing from the anode end to the cathode end and thence back to the anode end of the noise source.

One very important feature of the embodiment shown in Figs. 1 and 2 is that the inner conductor 32 does not contact glass cylinder 12. It has been found that if the inner conductor 32 of the noise source is permitted to contact inner glass cylinder 12 at any point along its length, a charge will be accumulated on glass envelope 12 which will adversely affect the operation of the noise source. If the inner conductor is permitted to touch the glass, a noise source terminated in a fixed impedance will generate an output signal which is peaked at one or more discrete frequencies rather than one which is uniformly distributed over the desired frequency band. Obviously such a noise source has little value in the testing art. The effect of the charge accumulation may be overcome by shorting the inner conductor to the outer conductor at the end of the noise source opposite to the end connected to the circuit under test. This method of eliminating the effect of the accumulated charge is generally undesirable for the reason that, in many cases, a short circuit between the inner and outer conductor of the noise source disturbs the bias potentials and other operating conditions of the system under test and may require additional measurements or calculations to be made in the testing procedure, all of which introduce additional sources of error.

The noise source shown in Fig. 1 has the further advantage that, in the absence of electrical discharge between anode 22 and cathode 26, the noise source acts as a section of conventional coaxial transmission line. If the noise source is connected in series with the coaxial line supplying the signal from an antenna to an ultrahigh frequency television set, the input to the receiver may be switched from the signal at the antenna to the standard output of the noise source by the simple expedient of turning on and off the potential supply to the anode 22 of the noise source. The above example is given merely by way of illustration. The serviceman or laboratory worker will find many other applications of the noise source as he becomes familiar with its operation.

The noise source shown in Fig. 1 may be operated with the cathode end adjacent the circuit under test. However, it has been found that the voltage standing wave ratio in a transmission line connected to the noise source in this manner varies over slightly wider limits than when the same transmission line is connected to the anode end of the noise source. It also has been found that if the noise source is to be operated over a narrow band of frequencies having an upper limit of approximately 900 to 1000 megacycles, the spacing between anode 22 and cathode 26 may be somewhat shorter than the above-mentioned 17 inches without adversely affecting the operation of the noise source.

It has been found experimentally that the electrical discharge between anode 22 and cathode 26 seldom fills the entire area of the transmission line. In most instances the discharge takes place within a small helical area which may include two or more complete turns between the points where chambers 22 and 24 connect with outer glass cylinder 14. In this specification the terms helix and helical are used in their broadest sense to denote any spiral or winding form. Under certain conditions which are not subject to precise control such as slight irregularities present in the glass envelope introduced in the manufacturing process, the discharge may take place in a pencil-shaped area which extends in a relatively straight line between the points where chambers 22 and 24 connect with outer glass cylinder 14. It has been found that a discharge of this type does not give sufficient attenuation for optimum operation of the noise source. Therefore it is highly desirable that means be provided to insure that the discharge follow the helical path giving the greater attenuation.

Figure 3:
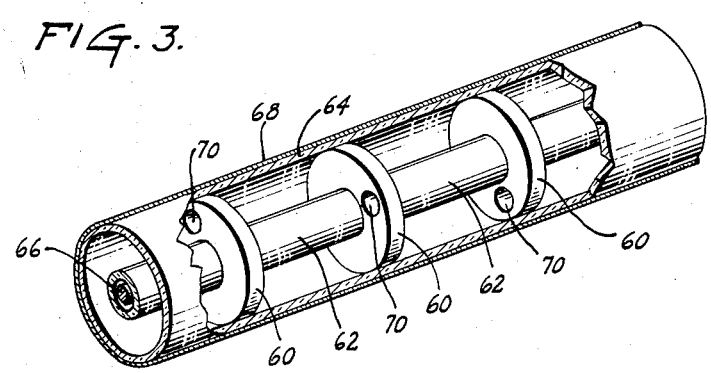
Fig. 3 is a fragmentary view of a second embodiment of the present invention with the outer conductor partially broken away.

Fig. 3 illustrates a modification of the preferred embodiment of Fig. 1 in which dielectric partition members 60 are provided between the inner glass cylinder 62 and the outer glass cylinder 64. In the interest of simplifying the drawing only the center section of the noise source is shown in Fig. 3. The end sections of the noise source may be identical to corresponding sections of the embodiment of Fig. 1. The noise source shown in Fig. 3 is provided with an inner conductor 66 and an outer metallic coating 68 corresponding to inner conductor 32 and outer coating 38 in the embodiment of Fig. 1. Dielectric partition members 60 are disposed at convenient intervals between the points at which the auxiliary envelopes housing the cathode and anode structures join outer cylinder 64. These auxiliary envelopes are not shown in Fig. 3 for the reason mentioned above. Each partition member 60 is provided with one or more openings 70 extending longitudinally therethrough. Adjacent partition members 60 are so oriented that the openings therein are not in alignment. The discharge between the anode and cathode structure will take place through openings 70 in the dielectric partition members 60, the path of the discharge thereby being forced to assume the desired helical or winding path.

Figure 4:
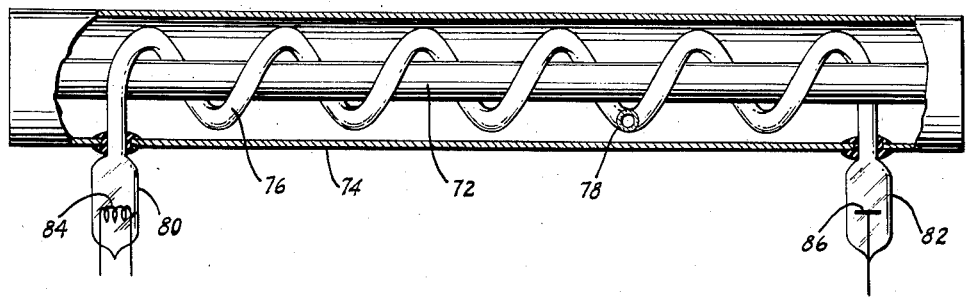
Fig. 4 is a fragmentary view of still another embodiment of the present invention with the outer conductor thereof partially broken away.

Fig. 4 illustrates still another embodiment of the invention which operates in generally the same fashion as the embodiment shown in Fig. 1. In Fig. 4, the coaxial line portion of the noise source is formed by an inner conductor 72 and a metallic outer conductor 74. Suitable coaxial connectors (not shown in Fig. 4) may be provided at the ends of conductors 72 and 74. A cylindrical glass envelope 76 is formed into a helix surrounding inner conductor 72. Preferably, the inner diameter of the helix is such that inner conductor 72 does not contact envelope 76. However, such contact between envelope 76 and inner conductor 72 does not always result in a degradation in the performance of the noise source and may be permitted in situations where it has no adverse effect as, for example, in applications in which the inner conductor of the noise source is shorted to the outer conductor. A revolved section of the cylindrical tube 76 is shown at 78. Envelopes 80 and 82 are joined to the two ends of tube 76 to house the cathode 84 and anode 86. The helical shape of tubing 76 confines the discharge between anode 86 and cathode 84 to the desired path. The number of turns in the helix and the diameters of inner conductors 72 and 74 will be determined largely by the desired attenuation to be obtained from the noise source, the frequency band over which the noise source is to operate and the characteristic impedance of the noise source.

Figure 5:
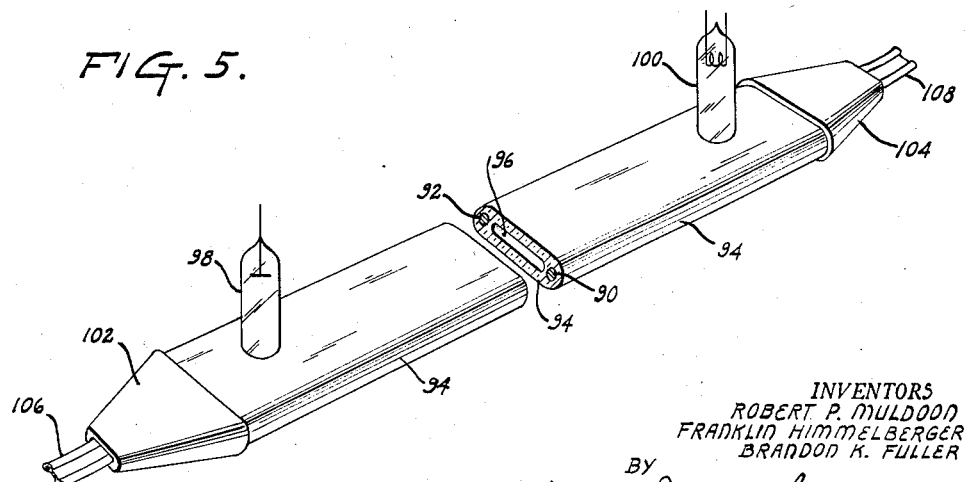
Fig. 5 is a pictorial view, partially in section, of an embodiment of the invention especially adapted for use with parallel wire transmission lines.

Fig. 5 shows an embodiment of the present invention suitable for use in connection with circuit elements energized by a two-conductor parallel wire transmission line. As shown by the cross-section portion of Fig. 5, the two conductors 90 and 92 of a two-conductor transmission line are molded into a glass envelope 94. An opening 96 is formed in envelope 94 to receive the inert gas through which the discharge takes place. Auxiliary chambers 98 and 100 which communicate with opening 26 are provided to house the anode and cathode structures of the noise source. Connectors 102 and 104 are provided at the two ends of the noise source which receive the two sections 106 and 108 of parallel wire transmission line. The noise source shown in Fig. 5 may be dimensioned to have a characteristic impedance substantially equal to 300 ohms so that it may be connected to a standard 300-ohm parallel wire line without special matching units. In the absence of an electrical discharge between the anode and cathode, the noise source will permit a signal to pass from transmission line section 108 to section 106. With an electrical discharge taking place between the anode and cathode, signals from transmission line 108 will be attenuated by the noise source so that the signal supplied to transmission line section 106 will comprise only the noise output produced by the gaseous discharge. The invention is not to be strictly limited to the embodiment detailed in Fig. 5 since this embodiment is subject to modifications which fall clearly within the scope of the invention. For example, the embodiment shown in Fig.

5 may be dimensioned to have a characteristic impedance other than 300 ohms if desired and the noise source may be so constructed that the anode and cathode are disposed within opening 96 thereby eliminating the need for auxiliary enclosures 98 and 100. It will be noted that both conductors 90 and 92 are in contact with glass envelope 94. In certain embodiments of the invention it is desirable to make conductors 90 and 92 self-supporting or support them by means isolated from envelope 94 and to form envelope 94 with small enough dimensions so that it extends between conductors 90 and 92 in a non-contacting relationship.

While we have described what is at present considered to be the preferred embodiments of the present invention, it will be recognized that other changes and modifications may be made therein without departing from the spirit and scope of the appended claims.

What is claimed is:

1. An ultrahigh frequency noise source comprising a two-conductor coaxial transmission line, an elongated, non-conductive, gas-tight envelope disposed between the inner and outer conductor of said coaxial line with the elongated dimension of said envelope substantially parallel to said conductors, said envelope being further disposed in spaced non-contacting relationship with said inner conductor, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, and contact means electrically coupled to said anode structure and said cathode structure to which energy may be supplied to cause an electrical discharge to occur between said anode structure and said cathode structure through said gas.

2. A noise source for use in the upper ultrahigh frequency range comprising a two-conductor coaxial line, an elongated, non-conductive, gas-tight envelope surrounding said inner conductor in a non-contacting relationship, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, and conductive means electrically coupled to said anode structure and said cathode structure to which energy may be supplied to cause an electrical discharge to occur between said anode structure and said cathode structure through said gas.

3. A noise source for use in the upper ultrahigh frequency range comprising a two-conductor coaxial line, an elongated, non-conductive, gas-tight envelope surrounding said inner conductor in a non-contacting relationship, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, and conductive means extending through said envelope and connected to said anode structure and said cathode structure to which energy may be supplied to cause an electrical discharge to occur between said anode structure and said cathode structure through said gas, said envelope providing only a restricted path entirely within said gas between said anode structure and said cathode structure along which a discharge may occur, said path following a winding course about said inner conductor.

4. A noise source for use in the upper ultrahigh frequency range comprising a two-conductor coaxial line, an elongated, toroidal, non-conductive, gas-tight envelope surrounding said inner conductor in a non-contacting relationship, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, conductive means extending through said envelope and connected to said anode structure and said cathode structure to which energy may be supplied to cause an electrical discharge to occur between said anode structure and said cathode structure through said gas, and means disposed within said envelope for causing said discharge to follow a helical path about said inner conductor.

5. A noise source for use in the upper ultrahigh frequency range comprising a two-conductor coaxial line, an elongated, toroidal, non-conductive, gas-tight envelope surrounding said inner conductor in a non-contacting relationship, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, conductive means extending through said envelope and connected to said anode structure and said cathode structure to which energy may be supplied to cause an electrical discharge to occur between said anode structure and said cathode structure through said gas, and a plurality of partition members disposed at longitudinally spaced points in said envelope, said partition members substantially closing the opening between the inner and outer walls of said toroidal envelope, each of said partition members being formed with an opening extending longitudinally therethrough, the openings in each partition member being rotationally displaced from the openings of adjacent partition members about the axis of said inner conductor whereby said discharge is forced to follow a helical path about said inner conductor.

6. A noise source for use in the upper ultrahigh frequency range comprising a two-conductor coaxial cable, an elongated non-conductive gas-tight envelope, said envelope having the form of a helix surrounding said inner conductor in a non-contacting relationship, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, said anode structure and said cathode structure being electrically isolated from said two conductors, and conductive means extending through said envelope and connected to said anode structure and said cathode structure to which energy may be supplied to cause an electrical discharge to occur between said anode structure and said cathode structure through said gas.

7. A noise source for use in the upper ultrahigh frequency range comprising an elongated, toroidal, non-conductive gas-tight envelope, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, conductive means extending through said envelope and connected to said anode structure and said cathode structure to which energy may be supplied to cause an electrical discharge to occur between said anode structure and said cathode structure through said gas, first and second coaxial connectors secured to the anode and cathode ends respectively of said envelope, a substantially continuous conductive coating disposed on the outer surface of said envelope, said conductive coating making electrical contact with the outer shells of said two connectors and forming the outer conductor of a coaxial line extending therebetween, a conductive rod extending longitudinally through the central opening of said toroidal envelope, said rod being electrically connected with the inner terminals of said coaxial connectors and forming the inner conductor of a coaxial line extending therebetween and means for supporting said conductive rod in a non-contacting relationship with said envelope.

8. A noise source as in claim 7 wherein said anode structure and said cathode structure are disposed in auxiliary envelopes communicating with said toroidal envelope, said auxiliary envelopes lying wholly outside the space between the inner and outer conductors of said coaxial line.

9. A noise source for use in the upper ultrahigh frequency range comprising an elongated, toroidal, non-conductive gas-tight envelope, said envelope being filled with an inert gas at a pressure of the order of approximately 10 to 60 millimeters of mercury, an anode structure disposed in contact with said gas adjacent one end of said envelope, a cathode structure disposed in contact with said gas adjacent the other end of said envelope, conductive means extending through said envelope and connected to said anode structure and said cathode structure to which energy may be supplied to cause an electrical discharge to occur between said anode structure and said cathode structure through said gas, said envelope containing means for causing said discharge to follow a helical path between said anode structure and said cathode structure, first and second coaxial connectors secured to the anode and cathode ends respectively of said envelope, a substantially continuous conductive coating disposed on the outer surface of said envelope, said conductive coating making electrical contact with the outer shells of said two connectors and forming the outer conductor of a coaxial line extending therebetween, a conductive rod extending longitudinally through the central opening of said toroidal envelope, said rod being electrically connected with the inner terminals of said coaxial connectors and forming the inner conductor of a coaxial line extending therebetween and means for supporting said conductive rod in a non-contacting relationship with said envelope.

10. An ultrahigh frequency noise source comprising a two-conductor coaxial transmission line, an elongated, non-conductive, gas-tight envelope disposed between the inner and outer conductor of said coaxial line and extending generally longitudinally of said transmission line, said envelope being spaced from said inner conductor throughout its length and being filled with an inert gas at a low pressure, and a cathode structure and an anode structure disposed at opposite ends of said envelope to which electrical energy may be supplied to cause an electrical discharge to occur therebetween.

11. An ultrahigh frequency noise source comprising a two-conductor coaxial transmission line, an elongated, non-conductive, gas-tight envelope disposed between the inner and outer conductor of said coaxial line and extending generally longitudinally of said coaxial line, said envelope being spaced from said inner conductor throughout its length, said envelope being filled with an inert gas at a low pressure, and a cathode structure and an anode structure disposed at opposite ends of said envelope to which electrical energy may be supplied to cause an electrical discharge to occur therebetween, said envelope providing only a restricted path entirely within said gas between said anode structure and said cathode structure through which a discharge may occur, said path following a winding course about said inner conductor.

12. An ultrahigh frequency noise source comprising a two-conductor coaxial transmission line, an elongated, non-conductive, gas-tight envelope disposed between the inner and outer conductor of said coaxial line and extending generally longitudinally of said coaxial line, said envelope being spaced from said inner conductor throughout its length, said envelope being filled with an inert gas at a low pressure, and an anode structure and a cathode structure disposed at opposite ends of said envelope to which electrical energy may be supplied to cause an electrical discharge to occur therebetween, said envelope providing only a restricted path entirely within said gas between said anode structure and said cathode structure along which a discharge path may occur, said path at any point along said transmission line being restricted to an area lying substantially to one side of the inner conductor, the angular positions of said areas about the axis of said inner conductor measured with respect to a line perpendicular to the longitudinal axis of said inner conductor varying from point to point along said envelope whereby said path follows a winding course about said inner conductor.

13. A noise source as in claim 12 wherein said envelope is formed in the shape of a helix about said inner conductor.

14. A noise source according to claim 12 wherein said envelope is formed in the shape of a toroid having partition members disposed at right angles to the longitudinal axis of said toroid, said partition members contacting both the inner and outer walls of said toroid, thereby to divide said envelope into a plurality of separate sections, each of said partition members being formed with an opening extending therethrough in a direction approximately parallel to said longitudinal axis of said toroid through which the discharge may take place.

References Cited in the file of this patent

UNITED STATES PATENTS

| | | |
|---|---|---|
| 1,971,944 | Wiegand | Aug. 28, 1934 |
| 2,557,961 | Goldstein et al. | June 26, 1951 |
| 2,581,819 | Strandberg | Jan. 8, 1952 |
| 2,641,702 | Cohen et al. | June 9, 1953 |